US 6,704,304 B1

(12) United States Patent
Gallagher et al.

(10) Patent No.: US 6,704,304 B1
(45) Date of Patent: Mar. 9, 2004

(54) SELECTIVE ESTABLISHMENT OF TELECOMMUNICATIONS CONNECTIONS OVER PACKET AND CIRCUIT SWITCHED NETWORKS

(75) Inventors: Maureen Brigid Gallagher, Naperville, IL (US); Paul R. Sand, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 737 days.

(21) Appl. No.: 09/588,248

(22) Filed: Jun. 6, 2000

(51) Int. Cl.[7] .............................................. H04L 12/56
(52) U.S. Cl. ...................... 370/352; 370/353; 370/401
(58) Field of Search ................................. 370/351, 352, 370/353, 401

(56) References Cited

U.S. PATENT DOCUMENTS

| | | | | |
|---|---|---|---|---|
| 5,392,402 A | * | 2/1995 | Robock, II | 395/200 |
| 5,691,985 A | * | 11/1997 | Lorenz et al. | 370/401 |
| 6,064,653 A | * | 5/2000 | Farris | 370/237 |
| 6,282,192 B1 | * | 8/2001 | Murphy et al. | 370/352 |
| 6,539,077 B1 | * | 3/2003 | Ranalli | 379/67.1 |
| 6,603,760 B1 | * | 8/2003 | Smyk | 370/352 |

* cited by examiner

Primary Examiner—Kenneth Vanderpuye

(57) ABSTRACT

A calling and called telecommunications station are each connected to a packet access network. The packet access network under the control of a server system, determines whether an originating call should be routed via a core packet network, such as the Internet, or a Public Switched Telephone Network (PSTN). If the expected delay of packets through the core packet network is excessive, then the call will be connected through the Public Switched Telephone Network. If, during the course of a call, the packet delay becomes excessive, and causes the quality of voice transmission to be below acceptable standards, the call is switched from the packet network to the Public Switched Telephone Network. Advantageously, as many calls as can be handled by the packet network are switched through that network, thus resulting in substantial savings to the customer. Advantageously, the embedded PSTN can be used productively to handle overflows from the core packet network. Advantageously, the quality of voice calls through the core packet network can be maintained by re-routing existing calls through the PSTN when necessary.

8 Claims, 3 Drawing Sheets

Figure 1:
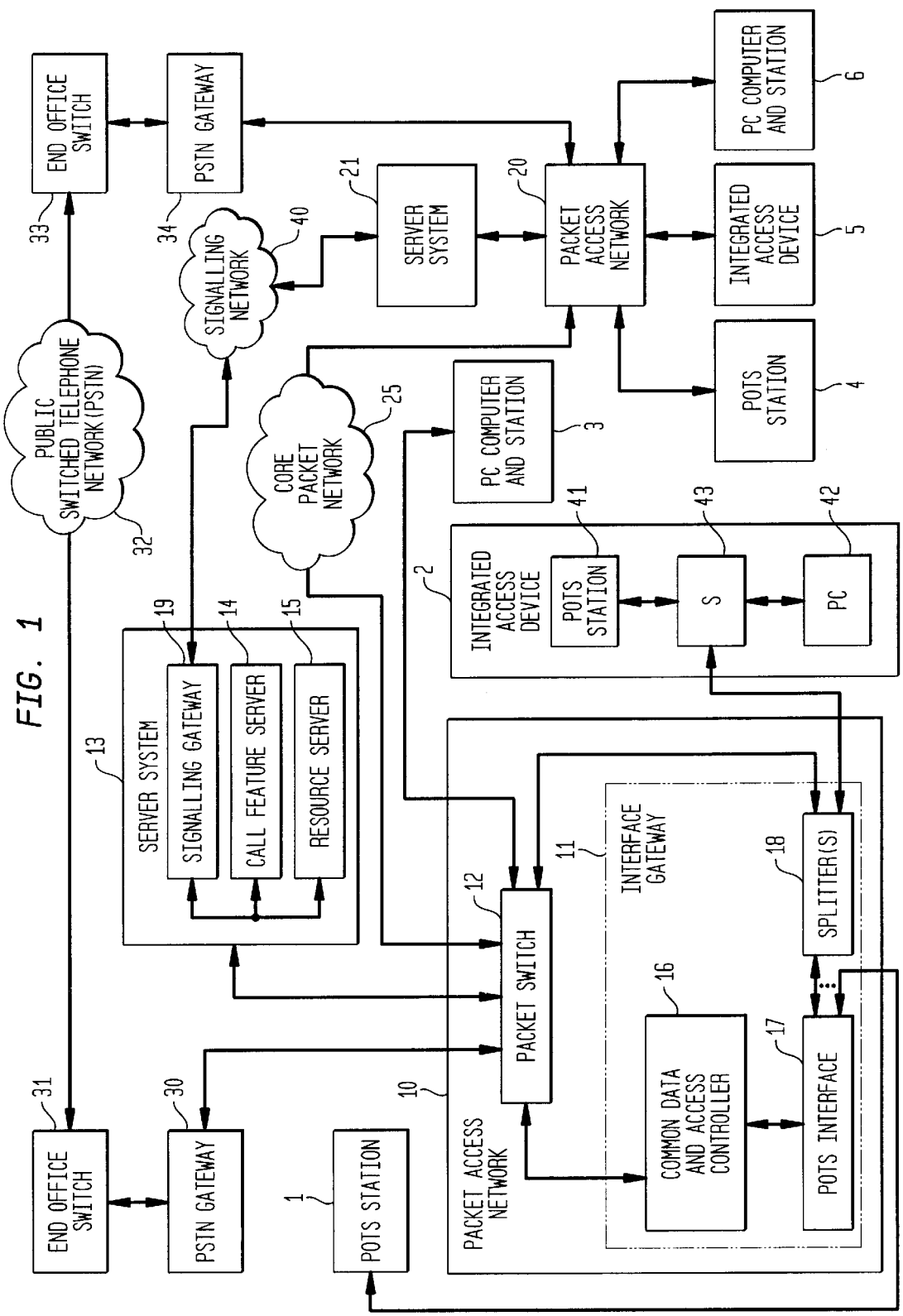

SELECTIVE ESTABLISHMENT OF TELECOMMUNICATIONS CONNECTIONS OVER PACKET AND CIRCUIT SWITCHED NETWORKS

TECHNICAL FIELD

This invention relates to the establishment of telecommunications connections over packetized networks and the Public Switched Telephone Network (PSTN).

PROBLEM

During the past few years, major improvements have been made in the transmission of voice communications over packetized networks. The simple arrangement is one wherein the voice signals are converted into Pulse Code Modulation (PCM), and these PCM signals are then sent over either an Asynchronous Transfer Mode (ATM) network basically substituting a packet network directly for the Public Switched Telephone Network (PSTN), a circuit switched network. The big progress which has been made in the use of the Internet network, a network which does not use a dedicated virtual circuit, but transmits each packet independently, has caused this network to be widely available. With the use of Internet networks, substantial delay and variations in the delay are encountered when the Internet network is relatively heavily loaded. When this happens, additional calls may be blocked and/or the quality of voice transmission may be degraded, and can become unsatisfactory. At the same time, when the Internet is not overloaded, the economics of using this type of network either already favor, or are likely in the near term future to favor, the use of the Internet network over the use of the PSTN. A problem of the prior art is how to use the combined resources of the Internet and the PSTN effectively.

SOLUTION

Applicants have analyzed this problem further and have recognized that a problem of the prior art is that when the Internet or some equivalent packet network becomes too heavily loaded, traffic should be moved to the Public Switched Telephone Network (parts of which may use ATM transmission) for new calls and, ideally, also for calls that are already in progress. The prior art does not suggest a good arrangement for performing this type of movement, and generally leaves it up to the customer premises equipment to determine which type of network connection should be established.

The above problem is solved and an advance is made over the prior art in accordance with Applicants' invention, wherein a local packet access network is used to access either a core packet network, such as the Internet, or the Public Switched Telephone Network (PSTN); the packet access network measures the delay of packets through the core packet network and the variation in the delay of these packets to the destination specified for a call; if this delay and/or the variation in the delay becomes excessive to the point that the quality of voice transmission becomes unsatisfactory, then new calls and existing calls are transferred to the Public Switched Telephone Network. Advantageously, the more economical network is used whenever the quality of voice transmission is satisfactory.

In accordance with one feature of Applicants' invention, if the call is originated from an intelligent terminal, such as a personal computer (PC), then the intelligent terminal can perform measurements to determine whether the delay characteristics to the destination are satisfactory or adequate quality voice transmission, and the intelligent terminal can receive information from the packet access network to specify whether a connection should originally be established using the PSTN, because the delay and variations in delay of packets to the specified destination is excessive. Advantageously, each customer can set an individual threshold of acceptable delay and acceptable variations in delay.

In accordance with Applicants' preferred embodiment, the packet access network comprises interface circuits for interfacing with local customer stations, a common data and access controller (COMDAC), and a packet switch. The COMDAC converts PCM signals generated by the interface circuits into packets, generally of the H.323 protocol used for transmitting voice over the Internet, for use by the packet switch and the packet switch accesses a core packet network 25, such as the Internet, directly, and accesses the PSTN 32 via a PSTN gateway and an end office switch. The common data and access controller in Applicants' preferred embodiment, converts individual voice communications destined for the core packet network into H.323 packets, or into PCM packets for transmission to the PSTN gateway. In accordance with another feature of Applicants' invention, the COMDAC also performs routine measurements on inter-packet delay for voice communications to different destinations, for those stations not directly connected to the packet switch.

In accordance with another feature of Applicants' preferred embodiment, intelligent customer premises equipment communicates directly with the packet switch without passing through the COMDAC. Effectively, the PC performs many of the functions of the COMDAC.

In accordance with Applicants' preferred embodiment, the packet switch of the access network is connected to a server system which includes a call feature server for analyzing customer dialed information and combining this data with information about the customer from a customer database in order to determine the routing of a call, routed via the core packet network. The call feature server also provides standard PSTN features (3-way calling, call forwarding, call waiting, etc.), for calls routed via the packet core network. The COMDAC communicates with the server system via the packet switch. A complex server system comprising a plurality of servers, can be used to further control a plurality of COMDAC's. For calls routed via the PSTN, the PSTN provides feature control.

The Server system of Applicants' preferred embodiment also includes a resource service, for providing such functions as dialed digit collection, digit out-pulsing, conference circuits, etc. The server system also includes a signaling gateway for communicating with other switches for PSTN calls when sending packet originated calls through the PSTN.

BRIEF DESCRIPTION OF THE DRAWING(S)

Figure 2:
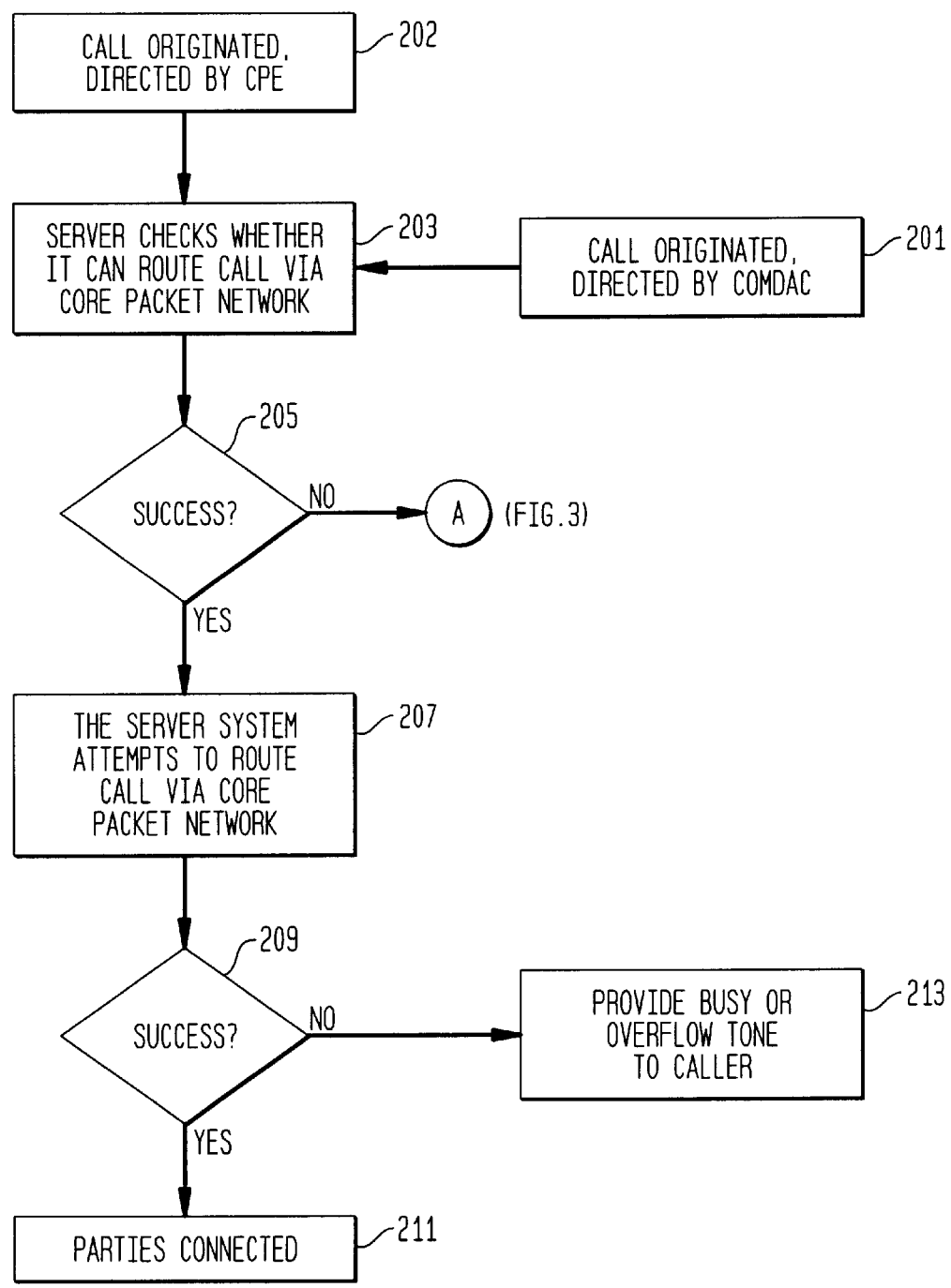
Figure 3:
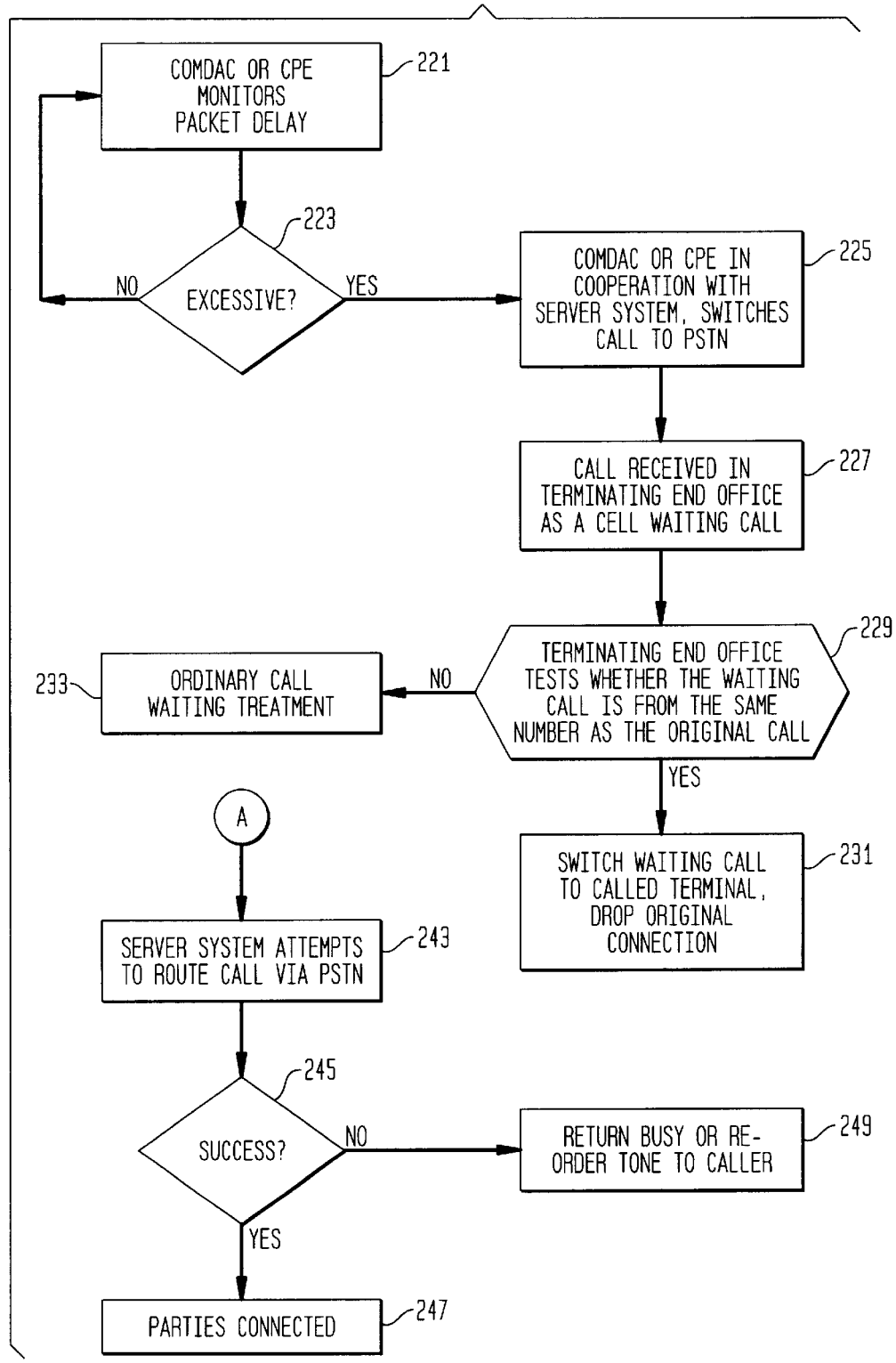

FIG. 1 is a block diagram illustrating Applicants' preferred embodiment of the invention; and FIGS. 2 and 3 are a flow diagram illustrating the method of Applicants' invention.

DETAILED DESCRIPTION

FIG. 1 is a block diagram illustrating Applicants' invention. Shown are three customer stations, Plain Old Telephone Service (POTS) station 1, integrated access devices (IAD) 2, and personal computer (PC) station 3, all connected to an originating packet access network 10, and comparable POTS station 4, IAD 5, and PC station 6, connected to a terminating packet access network 20. The packet access network includes a POTS interface circuit 17 for converting the analog POTS signals into PCM signals, which are then connected to COMDAC 16. A cable system modem, (not shown), for serving telephone customers is connected to a cable system interface, (not shown), which is also connected to the COMDAC. IAD 2 is connected to a splitter 18, which routes signals for use by the COMDAC, and directly by the packet switch. The splitter splits, or combines broadband POTS signals from, or with, upper band packetized digital signals, the combination of the two signals being transmitted over a digital subscriber line (DSL). The upper band packetized signals are routed directly to the packet switch. The resource server 15 of server system connected to the packet switch, extracts any dialed information by the caller. The server system 19 comprises a call feature server 14 for analyzing this dialed input from the resource server 15 and combining it with customer data from the customer database and network routing information from a network routing database, to determine where the call should be terminated and how the call should be routed. This information is sent back to the packet switch 12, which causes the correct packet connection to be made through the packet switch so that the call may be properly connected. The packet switch is connected to a core packet network 25, such as the Internet, for routing packetized calls. It is the assumption of this invention that normally the packet network will be a less expensive network for routing the call. For those routes in which this is not the case, the server system will notify the COMDAC to establish a connection via the PSTN for POTS calls, and will notify the PC or Integrated Access station for calls originated by these terminals.

The packet switch 12 is connected to core packet network 25 and is also connected to PSTN gateway 30 for accessing the PSTN via end office switch 31. The PSTN gateway converts between H.323 signals generated in the COMDAC, PC or IAD, and the PCM signals for accessing the end office switch 31 and PSTN 32.

The output of the COMDAC 16 is sent via the packet switch 12 to the PSTN Gateway 30, and to the Server System 13. Distortion is minimized if the COMDAC and the Packet Switch can send PCM signals from the POTS interface 17 directly to the PSTN Gateway without converting to H.323 protocol, for reconversion to PCM in the Gateway. Such signals can also be sent to the Server System 13.

The PSTN is terminated on end office switch 33 and PSTN gateway 34 which is connected to the terminating packet access network 20. The core packet network 25 is also connected to the terminating packet access network 20. Calls are then completed from the packet access network, using the services of terminating server system 21 to route the call to the correct terminating station.

If the decision to provide service from the PSTN is made prior to providing dial tone, dial tone is provided from the PSTN which also performs digit analysis. If the decision to provide service from the PSTN is made after the caller has dialed, the resource server, which has received the dialed information, forwards this dialed information to the PSTN via the packet switch and PSTN gateway.

FIGS. 2 and 3 illustrate the method of Applicants' invention. A call is originated and directed by COMDAC, (Action Block 201), or directed by the customer premises equipment (CPE), such as a PC of the customer's station or an integrated access device (IAD), (Action Block 202). The Server System checks whether the call can be routed via the packet network, (Action Block 203). This decision is based on whether the core packet network can be expected to provide packet transmission that meets the quality requirements of the network. For those cases in which the server recognizes that the packet network connection is less economical than a PSTN connection, the result of this check would also be negative. Test 205 determines whether the check of Action Block 203 was successful. If it was successful, the COMDAC or CPE, in cooperation with the server system, selects a route and attempts to route the call via the core packet network, (Action Block 207). Test 209 determines whether the attempt to route the call via the packet network was successful. If this attempt was successful, then the parties are connected, (Action Block 211). Otherwise, busy or overflow (fast busy) tone is returned to the caller, (Action Block 213).

Subsequently, the COMDAC or CPE monitors for packet delay during the conversation, (Action Block 221, FIG. 3). Test 223 determines whether this delay or the variation in this delay is excessive. If it is not excessive, then Action Block 221 is re-entered. If the delay is excessive, then the COMDAC or CPE causes the server system to switch the call to the PSTN. In order to switch the call, a second call is set up toward the terminating end office and that end office receives a waiting call, (Action Block 227). If it is determined by the terminating end office that the waiting call is from the same number as the original caller's number, (positive result of Test 229), then the incoming waiting call is switched to be connected to the called party, (Action Block 231), and the original connection is dropped. If Test 229 determines that it is not the same number, then ordinary call waiting treatment is provided, (Action Block 233). Note that the terminating party need not have call waiting service for this switch of the call to work, since the terminating end office determines the match before giving "normal call waiting treatment", (including not giving call waiting treatment to a call to a number which does not have call waiting service).

If the result of the check of whether the call can be routed via the packet network is negative, (negative result of Test 205, FIG. 2), or if the attempt to route the call via the packet network is not successful, (negative result of Test 209, FIG. 2), then the server system attempts to cause the call to be routed via the PSTN, (Action Block 243). Test 245 determines whether this attempt is successful. If the attempt is successful, the two parties are connected, (Action Block 247). If the attempt is not successful, then busy or re-order tone is returned to the caller, (Action Block 249).

The above is one preferred embodiment of Applicants' invention. Other embodiments will be apparent to those of ordinary skill in the art based on this description. The invention is limited only by the attached Claims.

We claim:

1. In a telecommunications network, comprising a core packet network and a circuit public switched telephone network (PSTN), apparatus for establishing a telecommunications connection comprising:

a packet access network connectable to a plurality of customer telephone stations; and a server system;

said packet access network comprising an interface gateway and a packet switch;

said packet switch for accessing said PSTN and said core packet network;

said interface gateway comprising circuits for converting signals from said plurality of customer telephone stations to packets for switching by said packet switch;

said saver system for controlling connections through said packet switch.

2. The apparatus of claim 1 wherein said interface gateway further comprises:

means for measuring delays of packet connections between said packet access network and another packet access network.

3. The apparatus of claim 1, wherein said server system comprises means for determining whether a call should be routed over said PSTN or said core packet network.

4. The apparatus of claim 3, wherein said interface gateway further comprises means for measuring delays of packet connections between said packet access network and another packet access network:

wherein said means for determining is responsive to said means for measuring; and wherein a new call is routed over said PSTN if, based on said measured delays, an expected delay for said new call is excessive.

5. The apparatus of claim 3, wherein said interface gateway further comprises means for measuring delays of packet connections between said packet access network and another packet access network:

wherein said means for determining is responsive to said means for measuring; and further comprising means for re-routing an existing call over said PSTN if said means for measuring measures an excessive delay on an existing call routed via said core packet network.

6. The apparatus of claim 5, wherein said means for re-routing an existing call comprises means for establishing an additional connection over said PSTN:

further comprising means for recognizing in a terminating system that said additional connection is from a same originating number as an original connection to a common terminating number; and means responsive to said recognizing for establishing said additional connection and dropping said original connection.

7. The apparatus of claim 1, wherein said server system comprises a call feature server for controlling connections trough said packet switch in response to signals from said customer telephone stations.

8. The apparatus of claim 1, wherein said interface gateway further comprises means for measuring delays of packet connections between said packet access network and another packet access network:

customer premises equipment (CPE) for generating and receiving packets; and wherein said CPE is connected directly to said packet switch.

* * * * *